US008397119B2

(12) United States Patent
Chang et al.

(10) Patent No.: US 8,397,119 B2
(45) Date of Patent: Mar. 12, 2013

(54) APPARATUS AND METHOD FOR GENERATING AUTOMATIC REPEAT REQUEST (ARQ) FEEDBACK MESSAGE IN WIRELESS COMMUNICATION SYSTEM

(75) Inventors: Young-Bin Chang, Anyang-si (KR); Taori Rakesh, Suwon-si (KR); Won-Il Lee, Seoul (KR); Jae-Young Kim, Yongin-si (KR); Anil Agiwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 839 days.

(21) Appl. No.: 12/544,741

(22) Filed: Aug. 20, 2009

(65) Prior Publication Data

US 2010/0050041 A1 Feb. 25, 2010

(30) Foreign Application Priority Data

| Aug. 20, 2008 | (KR) | 10-2008-0081280 |
| Feb. 23, 2009 | (KR) | 10-2009-0014774 |
| Apr. 28, 2009 | (KR) | 10-2009-0037349 |
| May 21, 2009 | (KR) | 10-2009-0044401 |

(51) Int. Cl.
  *H04L 1/18* (2006.01)
(52) U.S. Cl. ..................................................... 714/749
(58) Field of Classification Search .................. 714/749, 714/750
  See application file for complete search history.

(56) References Cited

U.S. PATENT DOCUMENTS

| 7,720,070 | B1 * | 5/2010 | Li ................................. | 370/392 |
| 7,848,755 | B2 * | 12/2010 | Cha et al. ....................... | 455/436 |
| 8,036,101 | B2 * | 10/2011 | Kim et al. ...................... | 370/216 |
| 2007/0245201 | A1 * | 10/2007 | Sammour et al. ............. | 714/748 |
| 2009/0150737 | A1 * | 6/2009 | Wang et al. .................... | 714/748 |

FOREIGN PATENT DOCUMENTS

| KR | 10-2005-0069903 A | 7/2005 |
| KR | 10-2007-0035916 A | 4/2007 |
| KR | 10-2007-0099369 A | 10/2007 |

* cited by examiner

*Primary Examiner* — Yolanda L Wilson
(74) *Attorney, Agent, or Firm* — Jefferson IP Law, LLP

(57) ABSTRACT

An apparatus and a method for generating an Automatic Repeat reQuest (ARQ) feedback message in a wireless communication system are provided. A method for generating an ARQ feedback message at a receiving end in a wireless communication system includes, generating first ARQ feedback information of a first scheme, the first ARQ feedback information comprising information of a first erroneous ARQ block of one or more ARQ blocks for which the ARQ feedback is not performed, generating second ARQ feedback information of a second scheme indicative of error of at least one ARQ block not represented in the first ARQ feedback information, generating an ARQ feedback message comprising the first ARQ feedback information and the second ARQ feedback information, and transmitting the ARQ feedback message to a transmitting end.

30 Claims, 7 Drawing Sheets

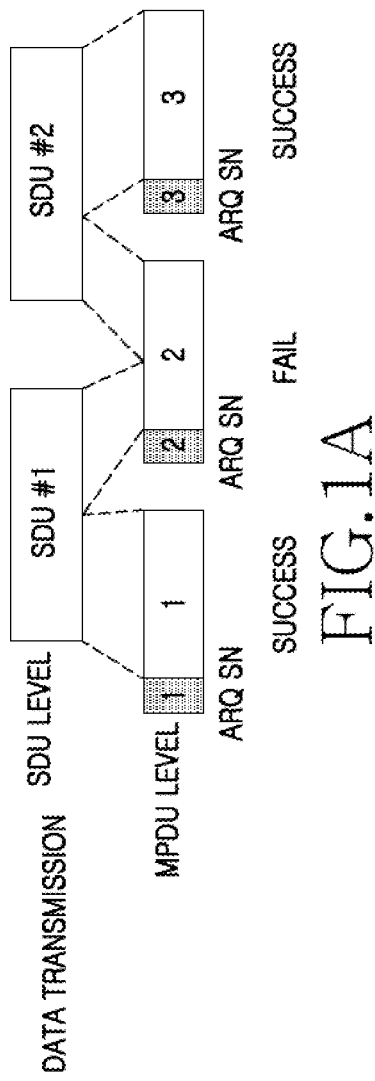
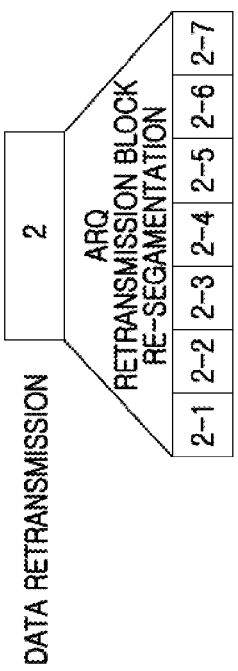
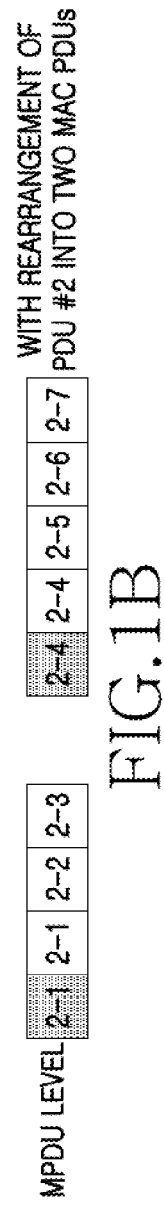
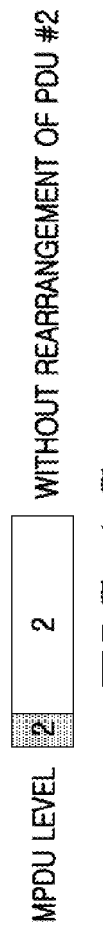
FIG.1A
FIG.1B
FIG.1C

APPARATUS AND METHOD FOR GENERATING AUTOMATIC REPEAT REQUEST (ARQ) FEEDBACK MESSAGE IN WIRELESS COMMUNICATION SYSTEM

PRIORITY

This application claims the benefit under 35 U.S.C. §119 (a) of a Korean patent application filed in the Korean Intellectual Property Office on Aug. 20, 2008 and assigned Serial No. 10-2008-0081280, a Korean patent application filed in the Korean Intellectual Property Office on Feb. 23, 2009 and assigned Serial No. 10-2009-0014774, a Korean patent application filed in the Korean Intellectual Property Office on Apr. 28, 2009 and assigned Serial No. 10-2009-0037349, and a Korean patent application filed in the Korean Intellectual Property Office on May 21, 2009 and assigned Serial No. 10-2009-0044401, the entire disclosures of all of which are hereby incorporated by reference.

BACKGROUND OF THE INVENTION

1. Field of the Invention

The present invention relates to an apparatus and a method for Automatic Repeat reQuest (ARQ) in a wireless communication system. More particularly, the present invention relates to an apparatus and a method for generating an ARQ feedback message in the wireless communication system.

2. Description of the Related Art

Wireless communication systems can encounter data error due to channel conditions of radio resources carrying the data. Accordingly, the wireless communication systems control and restore the data error using an Automatic Repeat reQuest (ARQ) scheme to raise transmission reliability.

Using the ARQ scheme, a receiving end informs a transmitting end of success or failure of the reception of ARQ blocks received from the transmitting end. For example, when the ARQ blocks are received from the transmitting end without error, the receiving end sends ACK information to the transmitting end. In contrast, when the ARQ blocks are received from the transmitting end with error, the receiving end sends NACK information to the transmitting end. Herein, a series of operations for transmitting the success or failure of the reception of the ARQ blocks from the receiving end to the transmitting end is referred to as ARQ feedback.

In the ARQ feedback, the receiving end can utilize a cumulative ACK scheme, a selective ACK scheme, and a block sequence ACK scheme.

Using the block sequence ACK, the receiving end indicates the reception success or failure of the ARQ blocks received from the transmitting end using bitmap and length information.

Using the selective ACK scheme, the receiving end indicates the reception success or failure of the ARQ blocks received from the transmitting end using a bitmap constituted by assigning one bit to each ARQ block. The number of bits forming the bitmap is constant. Accordingly, when the receiving end conducts the ARQ feedback on the ARQ blocks smaller than the bits forming the bitmap in number, the receiving end and the transmitting end are likely to waste the bits excluding the bits indicative of the reception success or failure of the ARQ blocks in the bitmap.

Using the cumulative ACK scheme, the receiving end transmits to the transmitting end a sequence number of the ARQ block having the greatest sequence number among the ARQ blocks successfully received prior to the first erroneous ARQ block. For example, when the receiving end receives 10 ARQ blocks out of 12 ARQ blocks from the transmitting end and the fourth, fifth, seventh, and ninth ARQ blocks are corrupted, the receiving end sends the third ARQ block sequence number to the transmitting end.

However, when the first ARQ block received from the transmitting end is corrupted, the receiving end cannot send the ARQ block sequence number to the transmitting end. In addition, the receiving end cannot inform the transmitting end of ACK information of the ARQ blocks successfully received after the ARQ block sequence number sent to the transmitting end through the ARQ feedback.

SUMMARY OF THE INVENTION

An aspect of the present invention is to address at least the above mentioned problems and/or disadvantages and to provide at least the advantages described below. Accordingly, an aspect of the present invention is to provide an apparatus and a method for generating an Automatic Repeat reQuest (ARQ) feedback message at a receiving end in a wireless communication system.

Another aspect of the present invention is to provide an apparatus and a method for generating an ARQ feedback message using a cumulative ACK scheme and a selective ACK scheme at a receiving end in a wireless communication system.

Yet another aspect of the present invention is to provide an apparatus and a method for reducing overhead of an ARQ feedback message according to a selective ACK scheme in a wireless communication system.

Still another aspect of the present invention is to provide an apparatus and a method for performing ARQ using a MAC Protocol Data Unit (MPDU) constituted with at least one ARQ block at a transmitting end in a wireless communication system.

A further aspect of the present invention is to provide an apparatus and a method for retransmitting an ARQ block by splitting the ARQ block into at least one ARQ sub-block when a transmitting end retransmits the ARQ block in a wireless communication system.

A further aspect of the present invention is to provide an apparatus and a method for generating an ARQ feedback message at a receiving end with respect to an ARQ block retransmitted and split into at least one ARQ sub-block in a wireless communication system.

According to an aspect of the present invention, a method for generating an ARQ feedback message at a receiving end in a wireless communication system is provided. The method includes, generating first ARQ feedback information of a first scheme, the first ARQ feedback information comprising information of a first erroneous ARQ block of one or more ARQ blocks for which the ARQ feedback is not performed, generating second ARQ feedback information of a second scheme indicative of error of at least one ARQ block not represented in the first ARQ feedback information, generating an ARQ feedback message comprising the first ARQ feedback information and the second ARQ feedback information, and transmitting the ARQ feedback message to a transmitting end.

According to another aspect of the present invention, a method for generating an ARQ feedback message at a receiving end in a wireless communication system is provided. The method includes, generating first ARQ feedback information comprising information of a first erroneous ARQ sub-block of one or more ARQ sub-blocks for which the ARQ feedback is not performed, generating second ARQ feedback information indicative of error of at least one ARQ sub-block not represented in the first ARQ feedback information, generating an ARQ feedback message comprising the first ARQ feedback information and the second ARQ feedback information, and transmitting the ARQ feedback message to a transmitting end.

According to yet another aspect of the present invention, an apparatus for generating an ARQ feedback message at a receiving end in a wireless communication system is provided. The apparatus includes a receiver for receiving ARQ blocks, an ARQ controller for checking for error of the ARQ blocks received from a transmitting end through the receiver, and for controlling to perform ARQ feedback to the transmitting end by taking into account an ARQ feedback execution time, an ARQ control message generator for, when the ARQ feedback is performed, generating an ARQ feedback message comprising first ARQ feedback information of a first scheme, the first ARQ feedback information comprising information of a first erroneous ARQ block of one or more ARQ blocks for which the ARQ feedback is not performed, and second ARQ feedback information of a second scheme indicative of error of at least one ARQ block not represented in the first ARQ feedback information, and a transmitter for transmitting the ARQ feedback message to the transmitting end.

According to still another aspect of the present invention, an apparatus for generating an ARQ feedback message at a receiving end in a wireless communication system is provided. The apparatus includes a receiver for receiving ARQ blocks and ARQ sub-blocks, an ARQ controller for checking for error in the ARQ blocks and the ARQ sub-blocks received from a transmitting end through the receiver, and for controlling to perform ARQ feedback to the transmitting end by taking into account an ARQ feedback execution time, an ARQ control message generator for, when the feedback for the ARQ sub-blocks is performed, generating an ARQ feedback message comprising first ARQ feedback information comprising information of a first erroneous ARQ sub-block of one or more ARQ sub-blocks for which the ARQ feedback is not performed, and second ARQ feedback information indicative of error of at least one ARQ sub-block not represented in the first ARQ feedback information, and a transmitter for transmitting the ARQ feedback message to the transmitting end.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following detailed description taken in conjunction with the accompanying drawings, in which:

FIGS. 1A, 1B and 1C illustrate an ARQ block in a wireless communication system according to an exemplary embodiment of the present invention;

Throughout the drawings, like reference numerals will be understood to refer to like parts, components and structures.

DETAILED DESCRIPTION OF EXEMPLARY EMBODIMENTS

Figure 2:
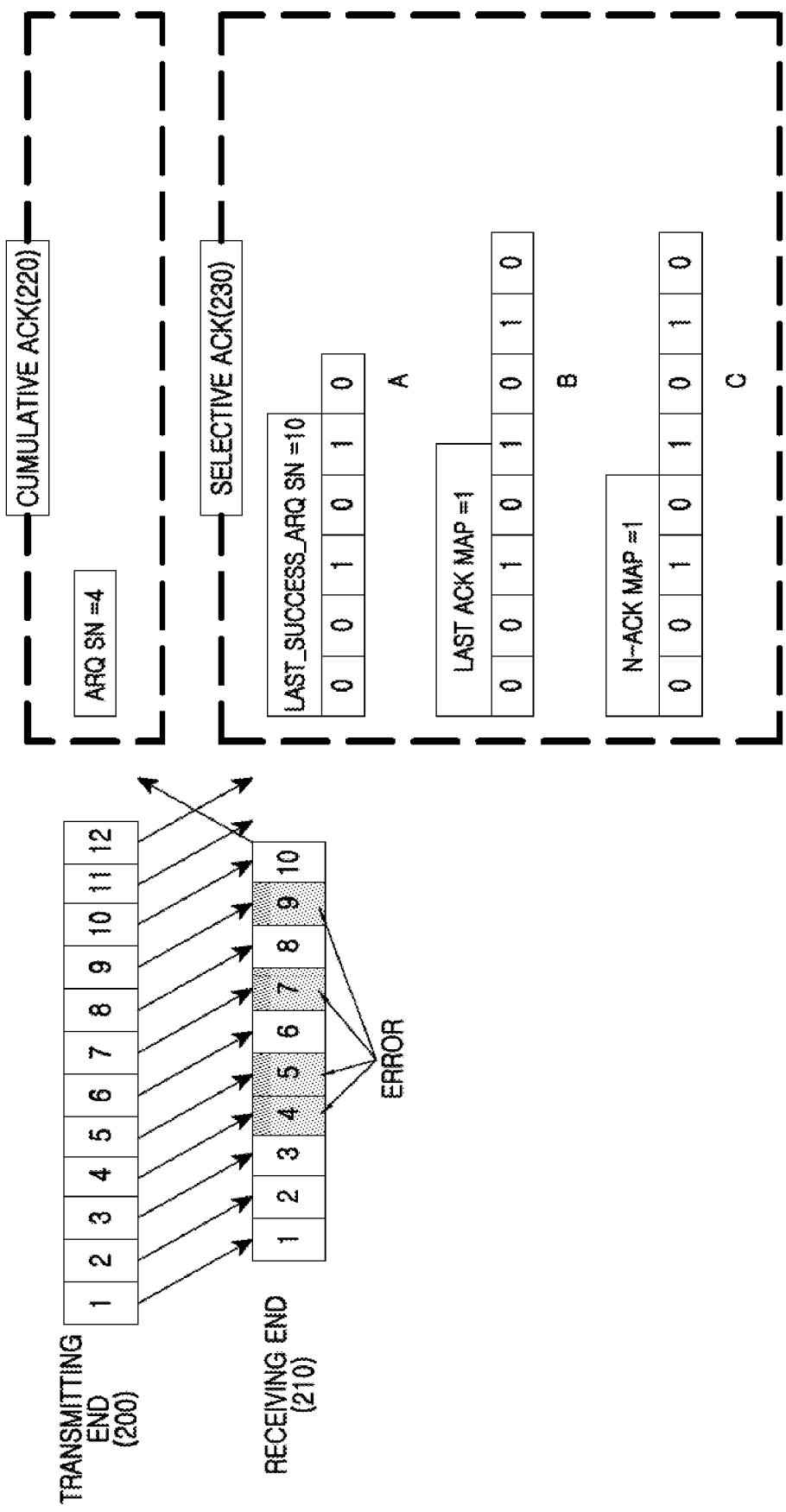
FIG. 2 illustrates an ARQ feedback message in a wireless communication system according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for generating an Automatic Repeat reQuest (ARQ) feedback message at a receiving end using a cumulative ACK scheme and a selective ACK scheme in a wireless communication system.

Hereinafter, a transmitting end and a receiving end include all of transmitting and receiving nodes constituting the wireless communication system, such as base station controller, base station, mobile station, and relay station.

The ARQ operations are carried out in a Media Access Control (MAC) layer. For the ARQ, the transmitting end generates an ARQ block in the MAC layer or an ARQ block for the retransmission as illustrated in FIG. 1.

FIGS. 1A, 1B, and 1C depict the ARQ block in the wireless communication system according to an exemplary embodiment of the present invention.

More specifically, FIG. 1A illustrates an ARQ block for data delivery, FIG. 1B illustrates ARQ sub-blocks for retransmission, and FIG. 1C illustrates an ARQ block for retransmission.

The transmitting end constitutes MPDU, which is a transmission unit of the MAC layer, by splitting a Service Data Unit (SDU) transferred from an upper layer to the MAC layer or combining a plurality of SDUs as illustrated in FIG. 1A.

When the ARQ is applied to the MPDU, the transmitting end assigns ARQ block Sequence Numbers (SNs) on the MPDU basis. That is, the transmitting end defines one MPDU as one ARQ block. For example, when the upper layer transfers two SDUs to the MAC layer, the transmitting end constitutes three MPDUs with the two SDUs. The transmitting end assigns first, second, and third ARQ block SNs to the MPDUs respectively. Herein, the transmitting end adds control information such as the ARQ block SN to the MPDUs, similar to a MAC header.

When the second ARQ block of the ARQ blocks transmitted by the transmitting end is corrupted, the receiving end requests the retransmission of the second ARQ block to the transmitting end through the ARQ feedback.

The transmitting end can retransmit the corrupted ARQ block by splitting the ARQ block into a plurality of ARQ sub-blocks as illustrated in FIG. 1B. For example, the transmitting end segments the second ARQ block corrupted into 7 ARQ sub-blocks. Next, the transmitting end generates and transmits the MPDU including 3 ARQ sub-blocks and the MPDU including 4 ARQ sub-blocks, to the receiving end. In so doing, the transmitting end assigns the ARQ sub-block (SUB) SNs to the ARQ sub-blocks.

Upon receiving the ARQ sub-blocks, the receiving end generates ARQ feedback information for the retransmitted ARQ sub-blocks using the ARQ SUB SNs of the ARQ sub-blocks.

The transmitting end may retransmit the original ARQ block of the corrupted ARQ block to the receiving end as illustrated in FIG. 1C. For instance, the transmitting end retransmits the original ARQ block of the corrupted second ARQ block to the receiving end. The transmitting end retransmits the MPDU of the second ARQ block including the ARQ block SN to the receiving end.

Upon receiving the retransmitted ARQ block, the receiving end generates ARQ feedback information of the retransmitted ARQ block using the ARQ block SN of the ARQ block.

As such, the transmitting end transmits the ARQ block or the ARQ sub-blocks to the receiving end. The receiving end sends the ARQ feedback message generated using the cumulative ACK scheme and the selective ACK scheme to the transmitting end as illustrated in FIG. 2. Hereafter, the ARQ feedback information generated using the cumulative ACK scheme is refereed to as ACK feedback information of the cumulative ACK scheme, and the ARQ feedback information generated using the selective ACK scheme is referred to as ACK feedback information of the selective ACK scheme.

FIG. 2 depicts an ARQ feedback message in a wireless communication system according to an exemplary embodiment of the present invention.

In FIG. 2, the receiving end 210 generates the ARQ feedback messages indicative of the error of the ARQ blocks received from the transmitting end 200, using the cumulative ACK scheme and the selective ACK scheme.

The receiving end 210 generates the ARQ feedback information of the cumulative ACK scheme 220 indicative of the error of the ARQ blocks successfully received in succession. When every ARQ block is received from the transmitting end without error, the receiving end 210 generates the ARQ feedback information of the cumulative ACK scheme 220 including the SN of the last ARQ block successfully received. In contrast, when the ARQ blocks are received from the transmitting end 200 with error, the receiving end 210 generates the ARQ feedback information of the cumulative ACK scheme 220 with the SN of the first erroneous ARQ block.

The receiving end 210 generates ARQ feedback information of the selective ACK scheme 230 indicative of the error of the ARQ block, which is not included in the ARQ feedback information of ARQ block which was successfully received in the the cumulative ACK scheme 220. For example, when fourth, fifth, seventh, and ninth ARQ blocks of the ARQ blocks received from the transmitting end 200 are corrupted, the receiving end 210 generates the ARQ feedback information of the cumulative ARQ scheme 220 including the SN of the fourth ARQ block initially having the error, which means ARQ blocks up to the SN of the third ARQ block were successfully received. In addition, the receiving end 210 generates the ARQ feedback information of the selective ACK scheme 230 indicative of the error of the fourth through tenth ARQ blocks, The start information of selective ACK scheme 230 may be fourth or fifth ARQ block because the error indication of fourth ARQ block is represented in the cumulative ARQ scheme 220. In doing so, the receiving end 210 can generate the ARQ feedback information of the selective ACK scheme 230 in three manners.

First, the receiving end 210 can generate the ARQ feedback information A of the selective ACK scheme 230. More specifically, the receiving end 210 generates the ARQ feedback information of the selective ACK scheme 230 using the ARQ block information having the greatest SN of the successfully received ARQ blocks and a bitmap indicative of the error of the ARQ blocks. The bitmap indicates the presence or absence of the error in the ARQ blocks between the first erroneous ARQ block and the ARQ block having the greatest SN. For example, it is assumed that fourth, fifth, seventh, and ninth ARQ blocks out of the 10 ARQ blocks are not received from the transmitting end 200. The receiving end 210 decided these four ARQ blocks having an error. The receiving end 210 generates the ARQ feedback information A of the selective ACK scheme 230 using the tenth ARQ block information having the greatest SN of the successfully received ARQ blocks and the bitmap indicative of the error of the fourth through ninth ARQ blocks. Alternatively, the receiving end 210 may generate the ARQ feedback information of the selective ACK scheme using the tenth ARQ block information having the greatest SN of the successfully received ARQ blocks and the bitmap indicative of the error of the fifth through ninth ARQ blocks.

The receiving end 210 can generate the ARQ feedback message of Table 1 using the ARQ feedback information of the cumulative ACK scheme and the ARQ feedback information of the first selective ACK scheme. Herein, the receiving end 210 generates the ARQ feedback message in the form of an Information Element (IE).

TABLE 1

| Sytax | bit | Notes |
|---|---|---|
| ARQ_feedback_IE(LAST){ | | |
| ARQ feedback Type | 1 | 0 = ARQ feedback IE for ARQ block |
| | | 1 = ARQ feedback IE for ARQ sub-block |
| LAST | 1 | 0x0 = More ARQ feedback IE in the list |
| | | 0x1 = current Last ARQ feedback IE in the list |
| CID | xx | Connection ID |
| ACK Type | 1 | 0x0 = Cumulative ACK |
| | | 0x1 = Selective ACK MAP existence |
| ARQ SN | xx | ACK Type = 0x0, ARQ block up to and including ARQ SN has been received successfully. |
| | | ACK Type = 0x1, ARQ block less than ARQ SN has been received successfully. |
| if(ARQ type ==1){ | | |
| LAST SUCCESS ARQ SN | xx | The greatest ARQ SN in the successfully received ARQ block SNs |
| Selective ACK MAP | Variable | Each bit represents ACK or NACK of corresponding ARQ block. |
| } | | |
| } | | |

The ARQ feedback message includes an ARQ feedback Type field indicating whether the ARQ feedback using the ARQ feedback message relates to the ARQ block or the ARQ sub-block, a LAST field indicative of presence or absence of another ARQ feedback message, a Connection IDentifier (CID) field indicative of the CID of the receiving end 210, an ACK Type field indicative of the type of the ARQ feedback message, an ARQ SN field indicative of the SN of the ARQ block contained in the ARQ feedback information of the cumulative ACK scheme, a LAST SUCCESS ARQ SN field indicative of the ARQ block having the greatest SN among the successfully received ARQ blocks, and a Selective ACK MAP field indicative of the reception failure or success of the ARQ blocks which is not represented using the cumulative ACK scheme. The Selective ACK MAP field indicates the reception failure or success of the ARQ blocks between the ARQ blocks included to the ARQ SN field and the LAST SUCCESS ARQ SN field. The first bit of the Selective ACK MAP field indicates the reception success or failure of the ARQ block corresponding to the SN contained in the ARQ SN field. Alternatively, the first bit of the Selective ACK MAP field may indicate the reception success or failure of the ARQ block corresponding to the SN greater than the SN in the ARQ SN field by one.

As stated above, the receiving end can set the ARQ SN field value using the cumulative ACK scheme and the ARQ SN field value using both of the cumulative ACK scheme and the selective ACK scheme to different values. Correspondingly, upon receiving the ARQ feedback message generated as shown in Table 1, when the ACK Type field is 0, the transmitting end recognizes that the receiving end succeeds in receiving the ARQ blocks having the SN smaller than or equal to the SN of the ARQ SN field.

When the ACK Type field is 1, the transmitting end recognizes that the receiving end successfully receives the ARQ blocks having the SN smaller than the SN of the ARQ SN field.

Second, the receiving end 210 can generate the ARQ feedback information B of the selective ACK scheme 230. In more detail, the receiving end 210 can generate the ARQ feedback information B of the selective ACK scheme 230 using the bitmap of the fixed bits and existence information of the additional bitmap.

The receiving end 210 can generate the ARQ feedback message of Table 2 using the ARQ feedback information of the cumulative ACK scheme and the ARQ feedback information of the second selective ACK scheme. Herein, the receiving end 210 generates the ARQ feedback message in the form of an IE.

TABLE 2

| Sytax | bit | Notes |
|---|---|---|
| ARQ_feedback_IE(LAST){ | | |
| ARQ feedback Type | 1 | 0 = ARQ feedback IE for ARQ block |
| | | 1 = ARQ feedback IE for ARQ sub-block |
| LAST | 1 | 0x0 = More ARQ feedback IE in the list |
| | | 0x1 = Last ARQ feedback IE in the list |
| CID | xx | Connection ID |
| ACK MAP existence | 1 | 0x0 = Cumulative ACK |
| | | 0x1 = Selective ACK MAP existence |
| ARQ SN | xx | ACK MAP existence = 0x0, ARQ block up to and including ARQ SN has been received successfully. |
| | | ACK MAP existence = 0x1, ARQ block less than ARQ SN has been received successfully. |
| while(ACK MAP existence==1){ | | |
| ACK MAP existence | 1 | 0x0 = No more selective ACK MAP and ACK MAP existence fields. |
| | | 0x1 = Another set of selective ACK MAP and ACK MAP existence fields follows |

TABLE 2-continued

| Sytax | bit | Notes |
|---|---|---|
| Selective ACK MAP | yy | Each bit represents ACK or NACK of corresponding ARQ block |
| } | | |
| } | | |

The ARQ feedback message includes an ARQ feedback Type field indicating whether the ARQ feedback using the ARQ feedback message relates to the ARQ block or the ARQ sub-block, a LAST field indicative of the presence or absence of another ARQ feedback message, a CID field indicative of the CID of the receiving end 210, an ACK MAP existence field indicative of the type of the ARQ feedback message or whether the Selective ACK MAP field indicates the last ACK MAP, an ARQ SN field indicative of the SN of the ARQ block contained in the ARQ feedback information of the cumulative ACK scheme, and a Selective ACK MAP field indicative of the error of the ARQ blocks not represented using the cumulative ACK scheme. That is, the Selective ACK MAP field indicates the error occurrence information of the ARQ blocks following the ARQ SN field. The first bit of the Selective ACK MAP field indicates the reception success or failure of the ARQ block corresponding to the SN of the ARQ SN field. Alternatively, the first bit of the Selective ACK MAP field may indicate the reception success or failure of the ARQ block corresponding to the SN greater than the SN of the ARQ SN field by one.

Third, the receiving end 210 can generate the ARQ feedback information C of the selective ACK scheme 230. More specifically, the receiving end 210 can generate the ARQ feedback information C of the selective ACK scheme 230 using the selective ACK MAP of the fixed bits and the number information of the selective ACK MAP contained in the ARQ feedback message. Herein, the selective ACK MAP can be generated as the bitmap.

The receiving end 210 can generate the ARQ feedback message of Table 3 using the ARQ feedback information of the cumulative ACK scheme and the ARQ feedback information of the third selective ACK scheme. Herein, the receiving end 210 generates the ARQ feedback message in the form of an IE.

The ARQ feedback message includes an ARQ feedback Type field indicating whether the ARQ feedback using the ARQ feedback message relates to the ARQ block or the ARQ sub-block, a LAST field indicative of the presence or absence of another ARQ feedback message, a CID field indicative of the CID of the receiving end 210, an ACK Type field indicative of the type of the ARQ feedback message, an ARQ SN field indicative of the SN of the ARQ block contained in the ARQ feedback information of the cumulative ACK scheme, a N_ACK MAP field indicative of the number of the selective ACK MAPs, and a Selective ACK MAP field indicative of the error of the ARQ blocks not represented using the cumulative ACK scheme. That is, the Selective ACK MAP field indicates the error occurrence information of the ARQ blocks following the ARQ SN field. The first bit of the Selective ACK MAP field indicates the reception success or failure of the ARQ block corresponding to the SN of the ARQ SN field. Alternatively, the first bit of the Selective ACK MAP field may indicate the reception success or failure of the ARQ block corresponding to the SN greater than the SN of the ARQ SN field by one.

The transmitting end can acquire the reception status of the ARQ blocks transmitted to the receiving end based on the ARQ feedback message received from the receiving end. Accordingly, when the receiving end receives the ARQ blocks without error, the transmitting end deletes the ARQ blocks received at the receiving end without error, from its transmission buffer for the sake of the transfer of new ARQ blocks.

Meanwhile, when the ARQ block sent to the receiving end is corrupted, the transmitting end retransmits the original ARQ block of the corrupted ARQ block to the receiving end. Alternatively, depending on the radio resource management policy of the transmitting end, the transmitting end may

TABLE 3

| Sytax | bit | Notes |
|---|---|---|
| ARQ_feedback_IE(LAST){ | | |
| ARQ feedback Type | 1 | 0 = ARQ feedback IE for ARQ block |
| | | 1 = ARQ feedback IE for ARQ sub-block |
| LAST | 1 | 0x0 = More ARQ feedback IE in the list |
| | | 0x1 = Last ARQ feedback IE in the list |
| CID | xx | Connection ID |
| ACK Type | 1 | 0x0 = Cumulative ACK |
| | | 0x1 = Selective ACK MAP existence |
| ARQ SN | xx | ACK Type = 0x0, ARQ block up to and including ARQ SN has been received successfully |
| | | ACK Type = 0x1, ARQ block less than ARQ SN has been received successfully. |
| if(ACK type == 1){ | | |
| N_ACK MAP | xx | Number of Selective ACK MAPs |
| Selective ACK MAP | variable | Each bit represents ACK or NACK of corresponding ARQ block. Total length of Selective ACK MAP is N_ACK MAP × one Selective ACK MAP size |
| } | | |
| } | | | retransmit the original ARQ block of the corrupted ARQ block by splitting the ARQ block into at least two ARQ sub-blocks. For example, when the fourth, fifth, seventh, and ninth ARQ blocks are corrupted as illustrated in FIG. 2, the transmitting end can retransmit the ARQ blocks as illustrated in FIG. 3.

Figure 3:
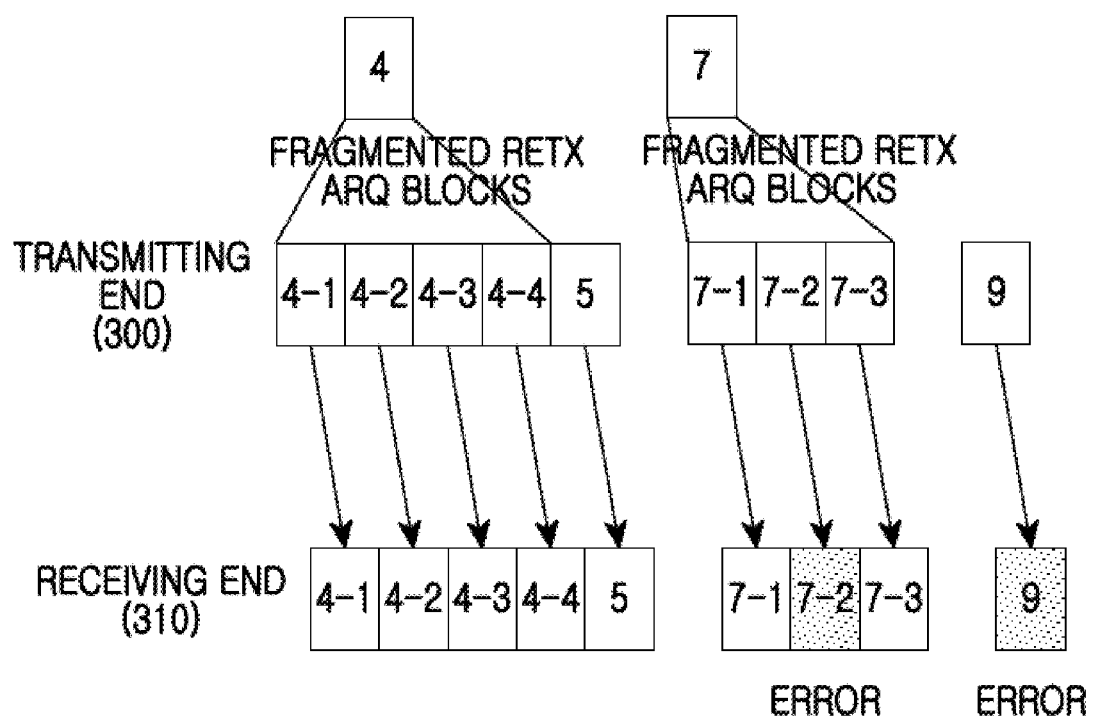
FIG. 3 illustrates an ARQ feedback message including ARQ feedback information with respect to a retransmitted ARQ block in a wireless communication system according to an exemplary embodiment of the present invention.

FIG. 3 depicts an ARQ feedback message including ARQ feedback information with respect to a retransmitted ARQ block in a wireless communication system according to an exemplary embodiment of the present invention.

When the fourth, fifth, seventh, and ninth ARQ blocks are received with error as illustrated in FIG. 3, the transmitting end 300 retransmits the erroneous ARQ blocks to the receiving end 310. The transmitting end 300 retransmits the same fifth and ninth ARQ blocks as the original ARQ blocks to the receiving end 310. The transmitting end 300 retransmits the fourth ARQ block fragmented into four ARQ sub-blocks and the seventh ARQ block fragmented into three ARQ sub-blocks to the receiving end 310. Herein, the transmitting end 300 assigns the ARQ SUB SNs to the ARQ sub-blocks respectively. More specifically, the transmitting end 300 assigns the ARQ SUB SNs from 4-1 to 4-4 to the fragmented ARQ sub-blocks of the fourth ARQ block, and the ARQ SUB SNs from 7-1 to 7-3 to the fragmented ARQ sub-blocks of the seventh ARQ block.

As such, when retransmitting the ARQ block, the transmitting end 300 may send a new ARQ block together with the retransmitted ARQ block.

Upon receiving the ARQ blocks retransmitted from the transmitting end 300, the receiving end 310 generates an ARQ feedback message indicating the error of the ARQ blocks retransmitted from the transmitting end 300, using the cumulative ACK scheme and the selective ACK scheme.

The receiving end 310 can generate the ARQ feedback message by adding an N_ARQ Block field indicative of the number information of the ARQ blocks including the ARQ sub-blocks into the ARQ feedback message of Table 1, Table 2, and Table 3. For example, when the N_ARQ Block field is added to Table 1, the receiving end 310 can generate the ARQ feedback message of Table 4. Herein, the receiving end 310 generates the ARQ feedback message in the form of an IE.

TABLE 4

| Sytax | bit | Notes |
|---|---|---|
| ARQ_feedback_IE2(LAST){ | | |
| ARQ feedback Type | 1 | 0 = ARQ feedback IE for ARQ block<br>1 = ARQ feedback IE for ARQ sub-block |
| LAST | 1 | 0x0 = More ARQ feedback IE in the list<br>0x1 = Last ARQ feedback IE in the list |
| CID | xx | Connection ID |
| N_ARQ Block | | Number of ARQ blocks having ARQ sub-block error |
| For(i<0; i<N_ARQ Block; i++){ | | |
| ACK SN | xx | SN of ARQ block having an ARQ sub-blocks received with error |
| ACK Type | 1 | 0x0 = Cumulative ACK<br>0x1 = Selective ACK MAP existence |
| ARQ SUB_SN | xx | ACK Type = 0x0, ARQ sub-block up to and including ARQ SUB_SN has been received successfully.<br>ACK Type = 0x1, ARQ sub-block less than ARQ SUB_SN has been received successfully. |
| if(ARQ type ==1){ | | |
| LAST SUCCESS ARQ SUB_SN | xx | The greatest ARQ SUB_SN among the successfully received ARQ SUB_SNs |
| Selective ACK MAP | Variable | Each bit represents ACK or NACK of corresponding ARQ sub-block. |
| }<br>}<br>} | | |

The ARQ feedback message includes an ARQ feedback Type field indicating whether the ARQ feedback using the ARQ feedback message relates to the ARQ block or the ARQ sub-block, a LAST field indicative of the presence or absence of another ARQ feedback message, a CID field indicative of the CID of the receiving end 210, an ARQ SN field indicative of the SN of the ARQ block including the erroneous ARQ sub-block, an N_ACK Block field indicative of the number of the ARQ blocks including the erroneous ARQ sub-block, an ACK Type field indicative of the type of the ARQ feedback message, an ARQ SUB_SN field indicative of the SN of the ARQ sub-block contained in the ARQ feedback information of the cumulative ACK scheme, a LAST SUCCESS ARQ SUB_SN field indicative of the ARQ sub-block having the greatest SN among the successfully received ARQ sub-blocks, and a Selective ACK MAP field indicative of the reception failure or success of the ARQ sub-blocks not represented using the cumulative ACK scheme. That is, the Selective ACK MAP field indicates the error occurrence information of the ARQ sub-blocks between the ARQ sub-blocks contained in the ARQ SUB_SN field and the LAST SUCCESS ARQ SUB_SN field. The first bit of the Selective ACK MAP field indicates the reception success or failure of the ARQ sub-block corresponding to the SN of the ARQ SUB_SN field. Alternatively, the first bit of the Selective ACK MAP field may indicate the reception success or failure of the ARQ sub-block corresponding to the SN greater than the SN of the ARQ SUB_SN field by one.

When the N_ARQ Block field is added to Table 2, the receiving end 310 can generate the ARQ feedback message of Table 5. Herein, the receiving end 310 generates the ARQ feedback message in the form of an IE.

TABLE 5

| Sytax | bit | Notes |
|---|---|---|
| ARQ_feedback_IE2(LAST){ | | |
| ARQ feedback Type | 1 | 0 = ARQ feedback IE for ARQ block |
| | | 1 = ARQ feedback IE for ARQ sub-block |
| LAST | 1 | 0x0 = More ARQ feedback IE in the list |
| | | 0x1 = Last ARQ feedback IE in the list |
| CID | xx | Connection ID |
| N_ARQ Block | | Number of ARQ blocks having an ARQ sub-block error |
| For(i<0; i<N_ARQ Block; i++){ | | |
| ARQ SN | xx | SN of ARQ block having ARQ sub-blocks received with error |
| ACK MAP existence | 1 | 0x0 = Cumulative ACK |
| | | 0x1 = Selective ACK MAP existence |
| ARQ SUB_SN | xx | ACK MAP existence = 0x0, ARQ sub-block up to and including ARQ SUB_SN has been received successfully. |
| | | ACK MAP existence = 0x1, ARQ sub-block less than ARQ SUB_SN has been received successfully. |
| while(ACK MAP existence==1){ | | |
| ACK MAP existence | 1 | 0x0 = No more selective ACK MAP and ACK MAP existence fields. |
| | | 0x1 = Another set of selective ACK MAP and ACK MAP existence fields follows |
| Selective ACK MAP | yy | Each bit represents ACK or NACK of corresponding ARQ sub-block. |
| } | | |
| } | | |
| } | | |

The ARQ feedback message includes an ARQ feedback Type field indicating whether the ARQ feedback using the ARQ feedback message relates to the ARQ block or the ARQ sub-block, a LAST field indicative of the presence or absence of another ARQ feedback message, a CID field indicative of the CID of the receiving end 210, an N_ACK Block field indicative of the number of the ARQ blocks including the erroneous ARQ sub-block, an ARQ SN field indicative of the SN of the ARQ block including the erroneous ARQ sub-block, an ACK MAP existence field indicative the type of the ARQ feedback message or whether the Selective ACK MAP field is the last ACK MAP, an ARQ SUB_SN field indicative of the SN of the ARQ sub-block contained in the ARQ feedback information of the cumulative ACK scheme, and a Selective ACK MAP field indicative of the reception failure or success of the ARQ sub-blocks not represented using the cumulative ACK scheme. That is, the Selective ACK MAP field indicates the error occurrence information of the ARQ sub-blocks following the ARQ SUB_SN field. The first bit of the Selective ACK MAP field indicates the reception success or failure of the ARQ sub-block corresponding to the SN of the ARQ SUB_SN field. Alternatively, the first bit of the Selective ACK MAP field may indicate the reception success or failure of the ARQ sub-block corresponding to the SN greater than the SN of the ARQ SUB_SN field by one.

When the N_ARQ Block field is added to Table 3, the receiving end 310 can generate an ARQ feedback message of Table 6. Herein, the receiving end 310 generates the ARQ feedback message in the form of an IE.

TABLE 6

| Sytax | bit | Notes |
|---|---|---|
| ARQ_feedback_IE2(LAST){ | | |
| ARQ feedback Type | 1 | 0 = ARQ feedback IE for ARQ block |
| | | 1 = ARQ feedback IE for ARQ sub-block |
| LAST | 1 | 0x0 = More ARQ feedback IE in the list |
| | | 0x1 = Last ARQ feedback IEs in the list |
| CID | xx | Connection ID |
| N_ARQ Block | | Number of ARQ blocks having an ARQ sub-blocks |
| For(i<0; i<N)ARQ Block; i++){ | | |
| ARQ SN | xx | SN of ARQ block having an ARQ sub-blocks received with error |
| ACK Type | 1 | 0x0 = Cumulative ACK |
| | | 0x1 = Selective ACK MAP existence |
| ARQ SUB_SN | xx | ACK Type = 0x0, ARQ sub-block up to and including ARQ SUB_SN has been received successfully. |
| | | ACK Type = 0x1, ARQ sub-block less than ARQ SUB_SN has been received successfully. |
| if(ACK type == 1){ | | |
| N_ACK MAP | xx | Number of Selective ACK MAPs |

TABLE 6-continued

| Sytax | bit | Notes |
|---|---|---|
| Selective ACK MAP | variable | Each bit represents ACK or NACK of corresponding ARQ sub-block. Total length of Selective ACK MAP is N_ACK MAP × one Selective ACK MAP size |
| } | | |
| } | | |
| } | | |

The ARQ feedback message includes an ARQ feedback Type field indicating whether the ARQ feedback using the ARQ feedback message relates to the feedback of the ARQ block or the feedback the ARQ sub-block, a LAST field indicative of the presence or absence of another ARQ feedback message, a CID field indicative of the CID of the receiving end 210, an ARQ SN field indicative of the SN of the ARQ block including the erroneous ARQ sub-blocks, a N_ACK Block field indicative of the number of the ARQ blocks including the erroneous ARQ sub-block, an ACK Type field indicative of the type of the ARQ feedback message, an ARQ SUB_SN field indicative of the SN of the ARQ sub-block contained in the ARQ feedback information of the cumulative ACK scheme, an N_ACK MAP field indicative of the number of the Selective ACK MAPs, and a Selective ACK MAP field indicative of the reception failure or success of the ARQ sub-blocks not represented using the cumulative ACK scheme. That is, the Selective ACK MAP field indicates the error occurrence information of the ARQ sub-blocks following the ARQ SUB_SN field. The first bit of the Selective ACK MAP field indicates the reception success or failure of the ARQ sub-block corresponding to the SN of the ARQ SUB_SN field. Alternatively, the first bit of the Selective ACK MAP field may indicate the reception success or failure of the ARQ sub-block corresponding to the SN greater than the SN of the ARQ SUB_SN field by one.

A method for generating an ARQ feedback message at a receiving end is described below.

Figure 4:
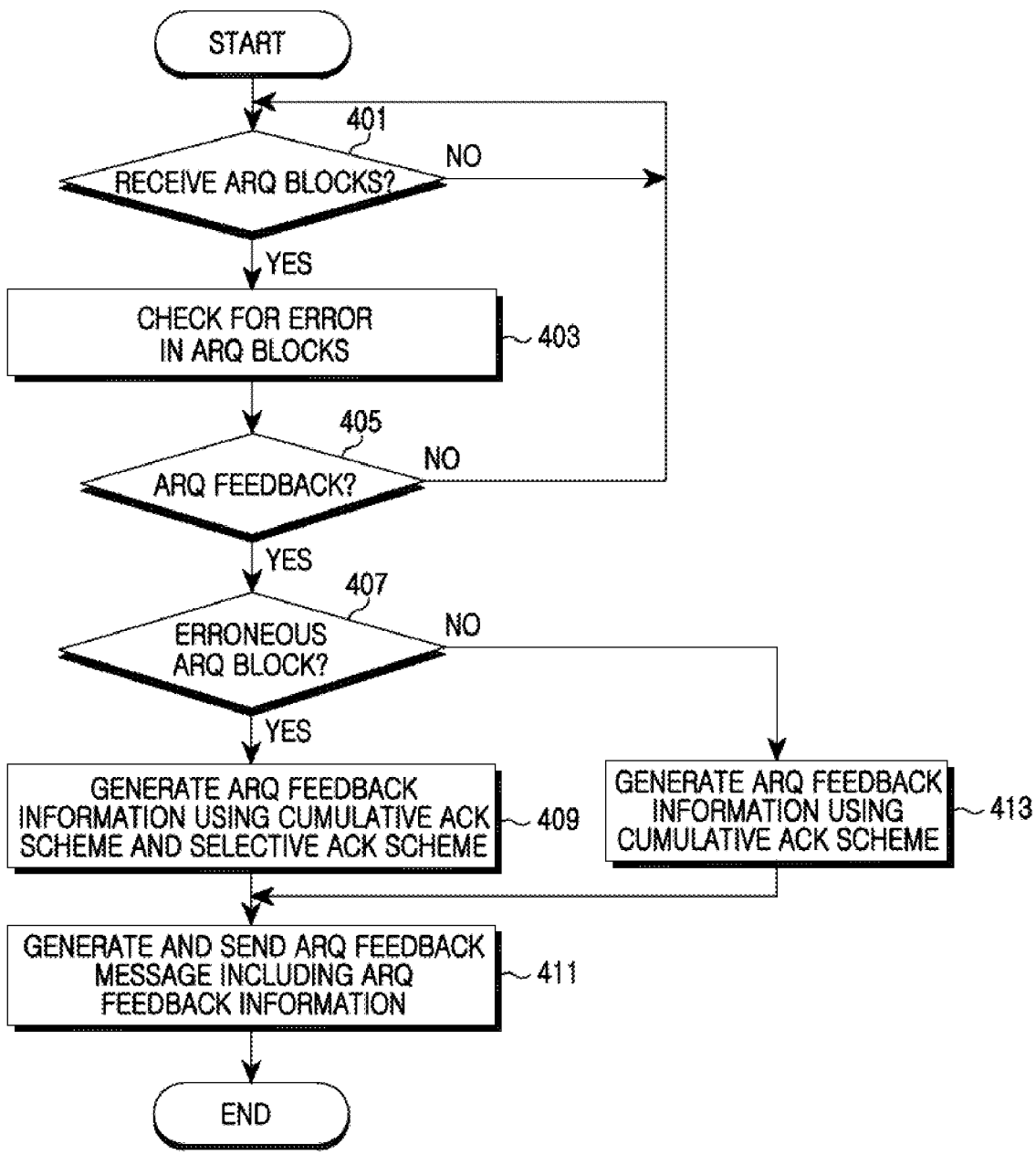
FIG. 4 illustrates a method for generating an ARQ feedback message at a receiving end in a wireless communication system according to an exemplary embodiment of the present invention.

FIG. 4 illustrates a method for generating an ARQ feedback message at a receiving end in a wireless communication system according to an exemplary embodiment of the present invention.

In step 401, the receiving end determines whether the ARQ blocks are received from the transmitting end.

When receiving the ARQ blocks, the receiving end checks for error of the received ARQ blocks in step 403.

In step 405, the receiving end determines whether to perform the ARQ feedback.

When not performing the ARQ feedback, the receiving end returns to step 401 and determines whether the ARQ blocks are received from the transmitting end.

To conduct the ARQ feedback, the receiving end determines whether there exists the erroneous ARQ block of the ARQ blocks for the ARQ feedback in step 407.

When there is no erroneous ARQ block, the receiving end generates the ARQ feedback information of the cumulative ACK scheme in step 413. For example, when the first through tenth ARQ blocks for the ARQ feedback are free from error, the receiving end generates the ARQ feedback information of the cumulative ACK scheme including the SN of the tenth ARQ block.

After generating the ARQ feedback information, the receiving end generates and transmits the ARQ feedback message including the ARQ feedback information of the cumulative ACK scheme to the transmitting end in step 411. For example, the receiving end generates the ARQ feedback message of Table 1, Table 2, or Table 3. Based on the type information of the ARQ feedback message, the transmitting end recognizes that the ARQ feedback message includes only the ARQ feedback information of the cumulative ACK scheme. Thus, the transmitting end recognizes that the receiving end successfully receives up to the ARQ blocks including the ARQ feedback information of the cumulative ACK scheme without error.

When detecting the erroneous ARQ block in step 407, the receiving end generates the ARQ feedback information of the cumulative ACK scheme and the ARQ feedback information of the selective ACK scheme in step 409. The receiving end generates the ARQ feedback information of the cumulative ACK scheme to include the SN of the first erroneous ARQ block. The receiving end generates the ARQ feedback information of the selective ACK scheme to indicate the error of the ARQ blocks not represented using the ARQ feedback information of the cumulative ACK scheme.

After generating the ARQ feedback information, the receiving end generates and transmits the ARQ feedback message including the ARQ feedback information of the cumulative ACK scheme and the ARQ feedback information of the selective ACK scheme, to the transmitting end in step 411. For example, the receiving end generates the ARQ feedback message of Table 1, Table 2, or Table 3. Alternatively, when generating the ARQ feedback message in relation to the ARQ sub-block, the receiving end generates the ARQ feedback message of Table 4, Table 5, or Table 6.

Based on the type information of the ARQ feedback message, the transmitting end recognizes that the ARQ feedback message includes the ARQ feedback information of the cumulative ACK scheme and the selective ACK scheme. Accordingly, the transmitting end recognizes that the receiving end successfully receives the ARQ blocks before the ARQ block contained in the ARQ feedback information of the cumulative ACK scheme. Based on the ARQ feedback information of the selective ACK scheme, the transmitting end can identify the additional ARQ blocks successfully received at the receiving end.

Next, the receiving end sends the ARQ feedback message to the transmitting end.

A method for transmitting or retransmitting an ARQ block at a transmitting end is described below.

Figure 5:
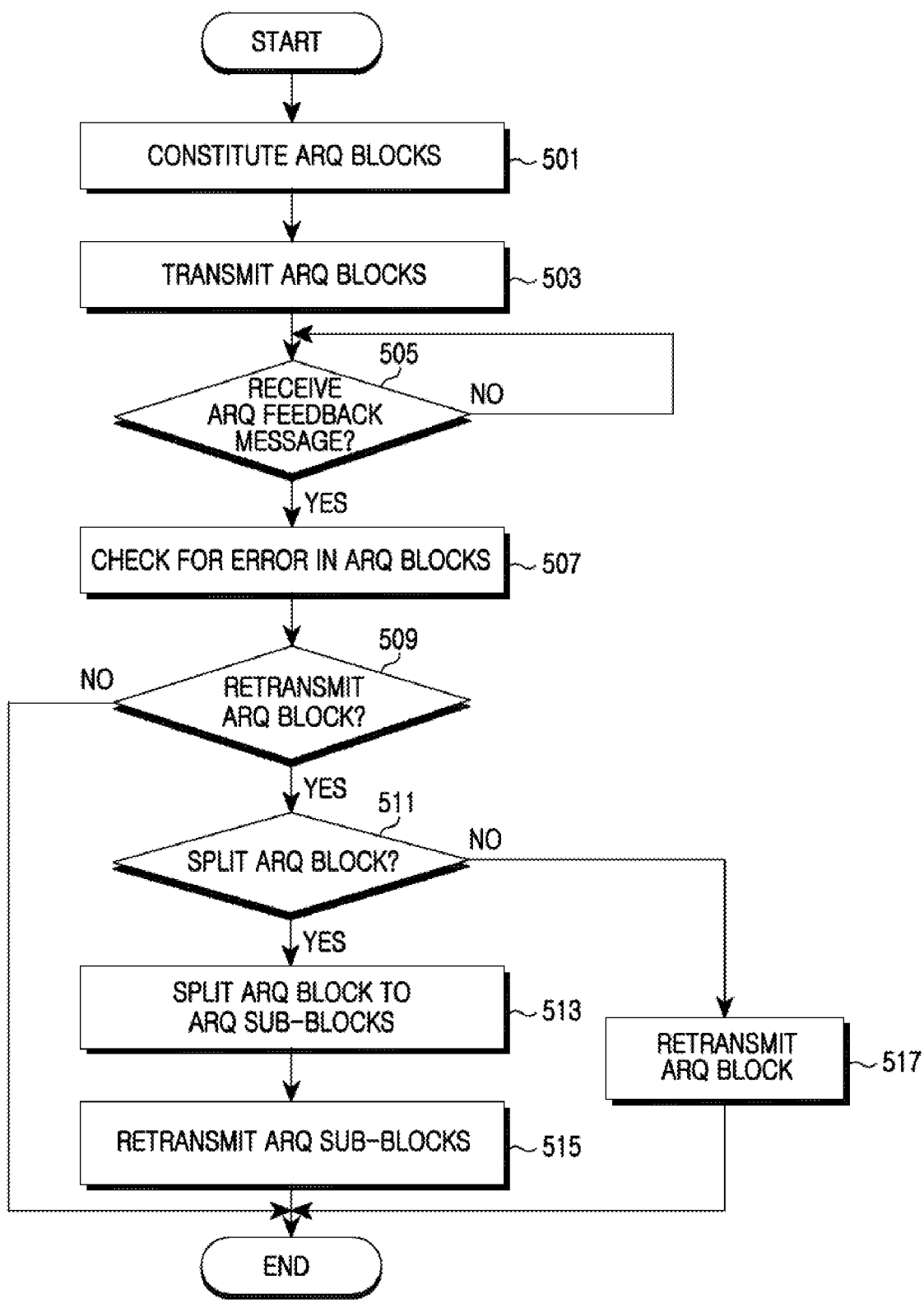
FIG. 5 illustrates a method for transmitting the ARQ block at a transmitting end in a wireless communication system according to an exemplary embodiment of the present invention.

FIG. 5 illustrates a method for transmitting an ARQ block at a transmitting end in a wireless communication system according to an exemplary embodiment of the present invention.

In step 501, the transmitting end generates the ARQ blocks to provide the communication service of the ARQ scheme. For instance, the transmitting end generates the ARQ blocks according to the scheduling of the SDU provided from the upper layer. Next, the transmitting end can generate a MAC Protocol Data Unit (MPDU) with at least one ARQ block. Alternatively, the transmitting end generates the ARQ block by splitting one SDU received from the upper layer or by combining the plurality of the SDUs. Next, the transmitting end generates one MPDU with one ARQ block.

In step 503, the transmitting end sends the ARQ blocks to the receiving end.

In step 505, the transmitting end determines whether the ARQ feedback message is received from the receiving end to which the ARQ blocks are transmitted.

Upon receiving the ARQ feedback message, the transmitting end checks for error of the ARQ blocks transmitted to the receiving end based on the ARQ feedback information contained in the ARQ feedback message in step 507. For example, when the ARQ feedback message includes the ARQ feedback information of the cumulative ACK scheme and the selective ACK scheme, the transmitting end recognizes that the receiving end successfully receives the ARQ blocks before the ARQ block contained in the ARQ feedback information of the cumulative ACK scheme. Based on the ARQ feedback information of the selective ACK scheme, the transmitting end can also identify the additional ARQ blocks successfully received at the receiving end.

Alternatively, when the ARQ feedback message includes only the ARQ feedback information of the cumulative ACK scheme, the transmitting end recognizes that the receiving end successfully receives the ARQ blocks up to the ARQ block contained in the ARQ feedback information of the cumulative ACK scheme.

After checking for the error of the ARQ blocks transmitted to the receiving end, the transmitting end determines whether there exists a new ARQ block to retransmit to the receiving end in step 509.

When there is no ARQ block to retransmit to the receiving end, the transmitting end finishes this process. Next, the transmitting end sends a new ARQ block.

When there is an ARQ block to retransmit to the receiving end, the transmitting end determines whether to segment the ARQ block to retransmit into the ARQ sub-blocks in step 511. In so doing, the transmitting end determines whether or not to split the ARQ block to retransmit into the ARQ sub-blocks according to the radio resource management policy of a scheduler. For example, when an ARQ block more robust to the radio channel than the initial transmission is transmitted or when a radio resource for the retransmission decreases to raise the transmission power, the transmitting end determines to segment the ARQ block to retransmit into the ARQ sub-blocks.

Upon determining to segment the ARQ block to retransmit into the ARQ sub-blocks in step 511, the transmitting end splits the ARQ block to retransmit to the plurality of the ARQ sub-blocks in step 513. Herein, the transmitting end can fix or vary the size of the segmented ARQ sub-blocks. The transmitting end assigns the ARQ SUB SNs to the ARQ sub-blocks. For example, when splitting the fourth ARQ block into four ARQ sub-blocks, the transmitting end assigns the ARQ SUB SNs from 4-1 to 4-4 to the ARQ sub-blocks.

In step 515, the transmitting end generates one or more MPDUs with the segmented ARQ sub-blocks and retransmits the MPDUs to the receiving end.

When determining not to split the retransmit ARQ block into the ARQ sub-blocks in step 511, the transmitting end retransmits to the receiving end the original ARQ block of the ARQ block received at the receiving end with error in step 517.

Next, the transmitting end finishes this process.

As mentioned above, the transmitting end can retransmit the ARQ block to the receiving end by splitting the ARQ block into at least two ARQ sub-blocks of fixed length or variable length. The size of the ARQ sub-block may be determined in the initial access or the connector initial determination of a base station and a mobile station, or set to a system parameter initially agreed between the base station and the mobile station.

A structure of a transmitting end for transmitting an ARQ block or ARQ sub-blocks is described below.

Figure 6:
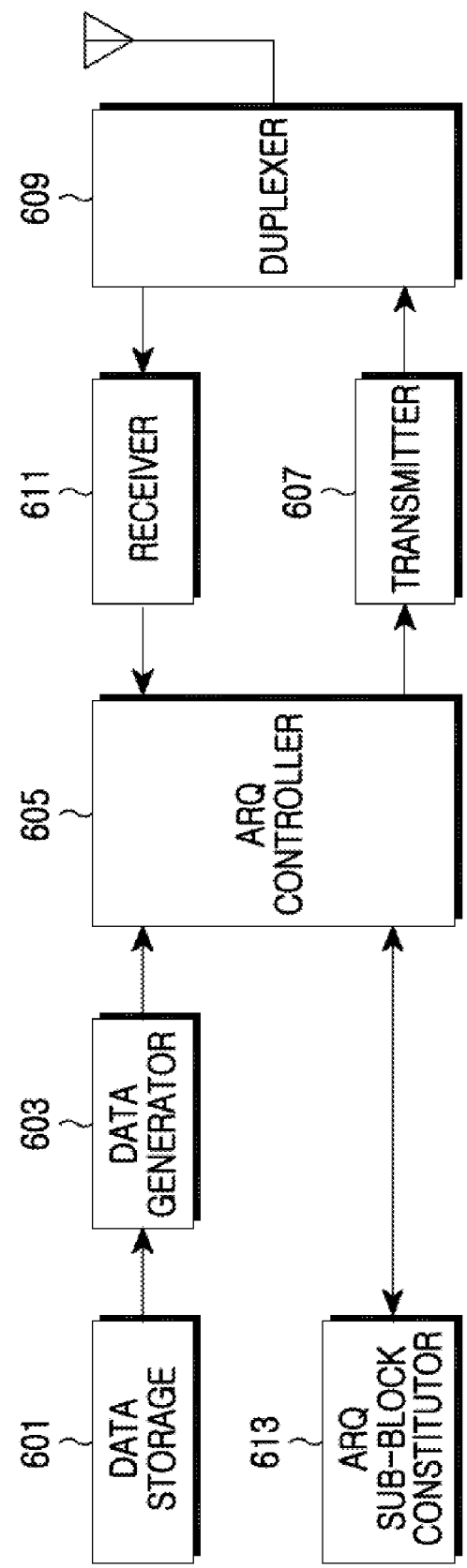
FIG. 6 illustrates a transmitting end in a wireless communication system according to an exemplary embodiment of the present invention.

FIG. 6 is a block diagram of a transmitting end in a wireless communication system according to an exemplary embodiment of the present invention.

The transmitting end of FIG. 6 includes a data storage 601, a data generator 603, an ARQ controller 605, a transmitter 607, a duplexer 609, a receiver 611, and an ARQ sub-block constitutor 613.

The data storage 601 stores data generating in the upper application program. For example, the data storage 601 is constructed in the form of a data queue.

The data generator 603 converts the data stored to the data storage 601 into a transmission size by splitting or incorporating the data according to the scheduling information.

The ARQ controller 605 generates the ARQ blocks for the ARQ of the data output from the data generator 603, and assigns the SNs to the ARQ blocks. For example, the ARQ controller 605 generates the ARQ blocks by splitting the SDU received from the upper layer by a specific data size. The ARQ controller 605 generates the MPDUs with at least one ARQ block and assigns the ARQ block sequence to the ARQ blocks according to the segmentation order of the SDU. Alternatively, the ARQ controller 605 generates the ARQ blocks by splitting one SDU received from the upper layer or incorporating the plurality of the SDUs. The ARQ controller 605 generates one MPDU with one ARQ block and assigns the ARQ block sequence in order.

The ARQ controller 605 checks for the error of the ARQ blocks transmitted to the receiving end, based on the ARQ feedback information of the ARQ feedback message received from the receiving end. For example, when the ARQ feedback message carries the ARQ feedback information of the cumulative ACK scheme and the selective ACK scheme, the ARQ controller 605 recognizes that the receiving end successfully receives the ARQ blocks before the ARQ block contained in the ARQ feedback information of the cumulative ACK scheme. Based on the ARQ feedback information of the selective ACK scheme, the ARQ controller 605 can identify the additional ARQ blocks successfully received at the receiving end.

Alternatively, when the ARQ feedback message carries only the ARQ feedback information of the cumulative ACK scheme, the ARQ controller 605 recognizes that the receiving end successfully receives the ARQ blocks up to the ARQ block contained in the ARQ feedback information of the cumulative ACK scheme.

When the ARQ block transmitted or retransmitted to the receiving end is corrupted, the ARQ controller 605 controls to retransmit the corrupted ARQ block. For example, the ARQ controller 605 determines whether or not to segment the retransmit ARQ block into the ARQ sub-blocks. Determining to split the ARQ block, the ARQ controller 605 controls the ARQ sub-block constitutor 613 to split the corrupted ARQ block into the ARQ sub-blocks. Not determining to split the ARQ block, the ARQ controller 605 controls to retransmit the original ARQ block of the corrupted ARQ block.

Under the control of the ARQ controller 605, the ARQ sub-block constitutor 613 segments the ARQ block, which is retransmitted because of the error, into at least two ARQ sub-blocks. The ARQ sub-block constitutor 613 can fix or vary the segmentation size of the ARQ sub-blocks.

The transmitter 607 includes a channel coding block, a modulation block, and a Radio Frequency (RF) processing block. The transmitter 607 converts the ARQ block or the ARQ sub-blocks output from the ARQ controller 605 into an RF signal and sends the RF signal to the receiving end via the duplexer 609. By way of example, the channel coding block includes a channel encoder, an interleaver, and a modulator. The modulation block includes an Inverse Fast Fourier Transform (IFFT) operator in a case of an Orthogonal Frequency Division Multiplexing (OFDM) scheme, and a code spread modulator in a case of a Code Division Multiple Access (CDMA) scheme. The RF processing block converts the baseband signal output from the modulation block into an RF signal and outputs the RF signal over an antenna.

The duplexer 609 transmits the transmit signal output from the transmitter 607 over the antenna and forwards a receive signal from the antenna to the receiver 611 in a duplexing manner.

The receiver 611 includes an RF processing block, a demodulation block, and a channel decoding block. The receiver 611 converts and demodulates an RF signal output from the duplexer 609 into a baseband signal. For example, the RF processing block converts the RF signal output from the duplexer 609 into the baseband signal. The demodulation block includes an FFT operator for extracting data carried by subcarriers from the signal output from the RF processing block. The channel decoding block includes a demodulator, a deinterleaver, and a channel decoder.

As constructed above, the ARQ controller 605 can function as the ARQ sub-block constitutor 613. Herein, they are separately provided to distinguish their functions. In the actual implementation, the ARQ controller 605 can process all or part of the functions of the ARQ sub-block constitutor 613.

A structure of a receiving end for generating an ARQ feedback message is described below.

Figure 7:
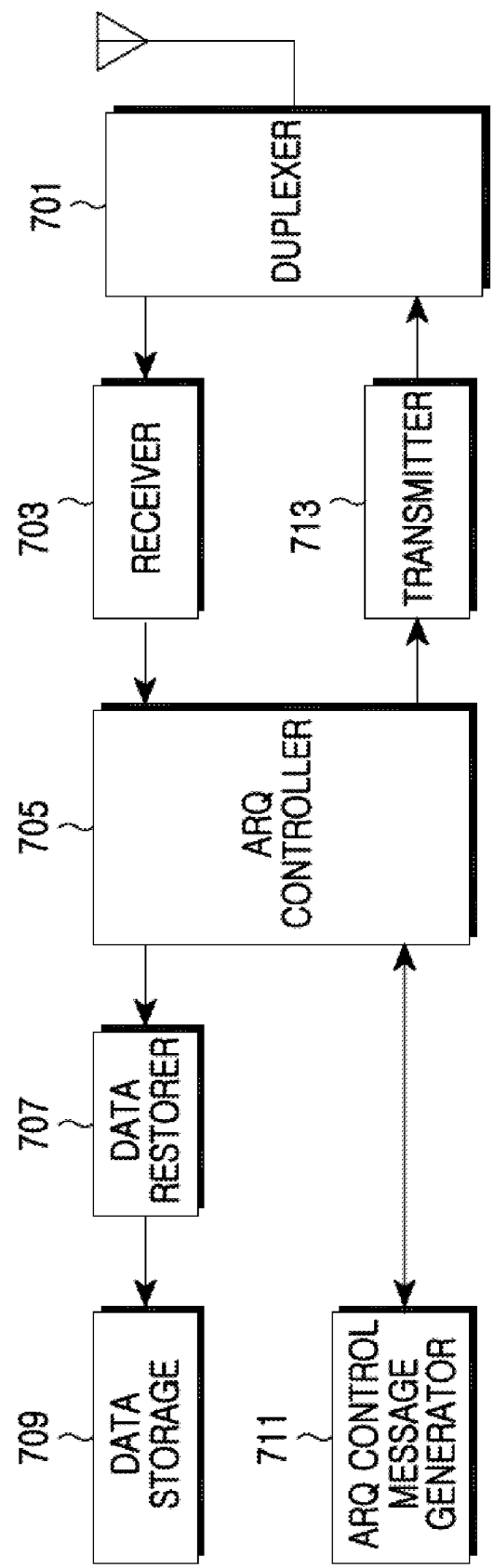
FIG. 7 illustrates a receiving end in a wireless communication system according to an exemplary embodiment of the present invention.

FIG. 7 is a block diagram of a receiving end in a wireless communication system according to an exemplary embodiment of the present invention.

The receiving end of FIG. 7 includes a duplexer 701, a receiver 703, an ARQ controller 705, a data restorer 707, a data storage 709, an ARQ control message generator 711, and a transmitter 713.

The duplexer 701 transmits a transmit signal output from the transmitter 713 over an antenna and forwards a receive signal from the antenna to the receiver 703 according to the duplexing manner.

The receiver 703 includes an RF processing block, a demodulation block, and a channel decoding block. The receiver 703 converts and demodulates the RF signal output from the duplexer 701 into the baseband signal. For example, the RF processing block converts the RF signal output from the duplexer 701 into the baseband signal. The demodulation block includes an FFT operator for extracting data carried by the subcarriers from the signal output from the RF processing block. The channel decoding block includes a demodulator, a deinterleaver, and a channel decoder.

The ARQ controller 705 confirms the sequence of the ARQ blocks output from the receiver 703 and checks for error of the ARQ blocks.

The ARQ controller 705 controls the ARQ control message generator 711 to confirm the ARQ feedback time and to generate the ARQ feedback message at the ARQ feedback time.

The data restorer 707 restores the original data of the data split or combined by the data generator 603 of the transmitting end, using the ARQ blocks successfully received at the ARQ controller 705 without error.

The data storage 709 stores the data restored by the data restorer 707, and provides the data to the upper application program. For example, the data storage 709 is constructed in the form of a data queue.

The ARQ control message generator 711 generates the ARQ feedback message to send to the transmitting end under the control of the ARQ controller 705. When the ARQ block received from the transmitted end has error, the ARQ control message generator 711 generates the ARQ feedback message using the ARQ feedback information of the cumulative ACK scheme and the selective ACK scheme. For example, the receiving end generates the ARQ feedback message using one of the constitution methods of Table 1, Table 2, and Table 3 according to the constitution of the ARQ feedback information of the selective ACK scheme.

When receiving the ARQ blocks from the transmitting end without error, the ARQ control message generator 711 generates the ARQ feedback message using the ARQ feedback information of the cumulative ACK scheme.

To generate the ARQ feedback message for the ARQ sub-blocks, the ARQ control message generator 711 generates the ARQ feedback message using one of the constitution methods of Table 4, Table 5 and Table 6.

The transmitter 713 includes a channel coding block, a modulation block, and an RF processing block. The transmitter 713 converts the ARQ feedback message output from the ARQ controller 705 into an RF signal and transmits the RF signal to the transmitting end via the duplexer 701. For example, the channel coding block includes a channel encoder, an interleaver, and a modulator. The modulation block includes an IFFT operator in a case of the OFDM scheme, and includes a code spread modulator in a case of the CDMA scheme. The RF processing block converts the baseband signal output from the modulation block into an RF signal and outputs the RF signal over an antenna.

As constructed above, the ARQ controller 705 can function as the ARQ control message generator 711. Herein, they are separately provided to distinguish their functions. In the actual implementation, the ARQ controller 705 can process all or part of the functions of the ARQ control message generator 711.

In the light of the foregoing as set forth above, since the receiving end of the wireless communication system generates the ARQ feedback message by use of the cumulative ACK scheme and the selective ACK scheme, the ARQ feedback of the ARQ blocks can be accomplished and the overhead in the ARQ feedback can be reduced. Further, since the transmitting end retransmits the ARQ block by adaptively splitting the ARQ block in accordance with the channel condition, the loss of the ARQ blocks can lowered.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating an Automatic Repeat reQuest (ARQ) feedback message at a receiving end in a wireless communication system, the method comprising:
generating first ARQ feedback information comprising information of a first erroneous ARQ block of one or more ARQ blocks;
generating second ARQ feedback information indicative of error of at least one ARQ block not represented in the first ARQ feedback information;

generating an ARQ feedback message comprising the first ARQ feedback information and the second ARQ feedback information; and transmitting the ARQ feedback message to a transmitting end.

2. The method of claim 1, wherein the generating of the second ARQ feedback information comprises:

generating the second ARQ feedback information as a bitmap indicative of error of the at least one ARQ block not represented in the first ARQ feedback information and error of the first erroneous ARQ block.

3. The method of claim 1, wherein the ARQ feedback message comprises at least one of type information of the ARQ feedback message, identifier information of the receiving end, information indicative of existence of another ARQ feedback message, constitution information of the ARQ feedback information, information indicative of whether bitmap information is a last bitmap, information indicative of a sequence number of the ARQ block contained in the first ARQ feedback information, and bitmap information indicative of error of the at least one ARQ block not represented using the first ARQ feedback information.

4. The method of claim 3, wherein the ARQ feedback message indicates the constitution information of the ARQ feedback information, information indicative of whether bitmap information is a last bitmap by equal field name.

5. The method of claim 1, further comprising:

determining whether there is an erroneous ARQ block among the ARQ blocks for the ARQ feedback;

when detecting no erroneous ARQ block, generating the third ARQ feedback information comprising information of a last ARQ block successfully received without error;

generating an ARQ feedback message comprising the third ARQ feedback information; and transmitting the ARQ feedback message to the transmitting end, wherein, when the erroneous ARQ block is detected, the first ARQ feedback information comprising information of the first erroneous ARQ block is generated.

6. The method of claim 1, further comprising:

determining whether to perform the ARQ feedback with respect to ARQ sub-blocks retransmitted by the transmitting end by splitting the erroneous ARQ block into at least two sub-blocks, when performing the ARQ feedback for the ARQ sub-blocks, generating fourth ARQ feedback information comprising information of a first erroneous ARQ sub-block among at least two ARQ sub-blocks for which the ARQ feedback is not performed;

generating fifth ARQ feedback information indicative of error of at least one ARQ sub-block not represented in the fourth ARQ feedback information;

generating an ARQ feedback message for the ARQ sub-block, the message comprising the fourth ARQ feedback information and the fifth ARQ feedback information; and transmitting the ARQ feedback message to a transmitting end by adding the ARQ feedback message for the ARQ sub-block to the ARQ feedback message, wherein, when the ARQ feedback is not performed for the ARQ sub-blocks, an ARQ feedback message comprising the first ARQ feedback information and the second ARQ feedback information is generated and transmitted to the transmitting end.

7. The method of claim 6, wherein the ARQ feedback message for the ARQ sub-block comprises at least one of type information of the ARQ feedback message, identifier information of the receiving end, information indicative of existence of another ARQ feedback message, information of a number of the ARQ blocks comprising the erroneous ARQ sub-block, identifier information of the ARQ block comprising the erroneous ARQ sub-block, constitution information of the ARQ feedback information, information indicative of whether bitmap information is a last bitmap, information indicative of a sequence number of the ARQ block contained in the third ARQ feedback information, and bitmap information indicative of error of the at least one ARQ block not represented using the third ARQ feedback information.

8. The method of claim 7, wherein the ARQ feedback message indicates the constitution information of the ARQ feedback information, information indicative of whether bitmap information is a last bitmap by equal field name.

9. The method of claim 1, wherein the wireless communication system comprises an Advanced Air Interface (AAI) system, wherein the information of the first erroneous ARQ block comprises a Sequence Number (SN) of an ARQ block, wherein a most significant bit (MSB) of the second ARQ feedback information represents ACK or NACK information of an ARQ block identified by the SN, wherein contiguous bits after the MSB of the second ARQ feedback information represent ACK or NACK information of contiguous ARQ blocks following the ARQ block identified by the SN, wherein the ARQ feedback message comprises a form of an Information Element (IE), and wherein the transmitting comprises use of Media Access Control (MAC) layer acknowledgment.

10. A method for generating an Automatic Repeat reQuest (ARQ) feedback message at a receiving end in a wireless communication system, the method comprising:

generating first ARQ feedback information comprising information of a first erroneous ARQ sub-block of one or more ARQ sub-blocks;

generating second ARQ feedback information indicative of error of at least one ARQ sub-block not represented in the first ARQ feedback information;

generating an ARQ feedback message comprising the first ARQ feedback information and the second ARQ feedback information and transmitting the ARQ feedback message to a transmitting end.

11. The method of claim 10, wherein the generating of the second ARQ feedback information comprises:

generating the second ARQ feedback information as a bitmap indicative of error of the at least one ARQ sub-block not represented in the first ARQ feedback information and error of the first erroneous ARQ sub-block.

12. The method of claim 10, wherein the ARQ feedback message comprises at least one of type information of the ARQ feedback message, identifier information of the receiving end, information indicative of existence of another ARQ feedback message, information of a number of the ARQ blocks comprising the erroneous ARQ sub-block, identifier information of the ARQ block comprising the erroneous ARQ sub-block, constitution information of the ARQ feedback information, information indicative of whether bitmap information is a last bitmap, information indicative of a sequence number of the ARQ sub-block contained in the third ARQ feedback information, and bitmap information indicative of error of the at least one ARQ block not represented using the third ARQ feedback information.

13. The method of claim 12, wherein the ARQ feedback message indicates the constitution information of the ARQ feedback information, information indicative of whether bitmap information is a last bitmap by equal field name.

14. The method of claim 10, further comprising:
determining whether there is an erroneous ARQ sub-block;
when detecting no erroneous ARQ sub-block, generating third ARQ feedback information comprising information of a last ARQ sub-block successfully received without error;
generating an ARQ feedback message comprising the third ARQ feedback information; and
transmitting the ARQ feedback message to the transmitting end,
wherein, when the erroneous ARQ sub-block is detected, the first ARQ feedback information comprising information of the first erroneous ARQ sub-block is generated.

15. The method of claim 10,
wherein the wireless communication system comprises an Advanced Air Interface (AAI) system,
wherein the information of the first erroneous ARQ block comprises a Sequence Number (SN) of an ARQ block,
wherein a most significant bit (MSB) of the second ARQ feedback information represents ACK or NACK information of an ARQ block identified by the SN,
wherein contiguous bits after the MSB of the second ARQ feedback information represent ACK or NACK information of contiguous ARQ blocks following the ARQ block identified by the SN,
wherein the ARQ feedback message comprises a form of an Information Element (IE), and
wherein the transmitting comprises use of Media Access Control (MAC) layer acknowledgment.

16. An apparatus for generating an Automatic Repeat reQuest (ARQ) feedback message at a receiving end in a wireless communication system, the apparatus comprising:
a receiver for receiving ARQ blocks;
an ARQ controller for checking for error of the ARQ blocks received from a transmitting end through the receiver, and for controlling to perform ARQ feedback to the transmitting end by taking into account an ARQ feedback execution time;
an ARQ control message generator for, when the ARQ feedback is performed, generating an ARQ feedback message comprising first ARQ feedback information comprising information of a first erroneous ARQ block of one or more ARQ blocks, and second ARQ feedback information indicative of error of at least one ARQ block not represented in the first ARQ feedback information; and
a transmitter for transmitting the ARQ feedback message to the transmitting end.

17. The apparatus of claim 16, wherein the ARQ control message generator generates the second ARQ feedback information as a bitmap indicative of error of the at least one ARQ block not represented in the first ARQ feedback information and error of the first erroneous ARQ block.

18. The apparatus of claim 16, wherein the ARQ control message generator generates the ARQ feedback message comprising at least one of type information of the ARQ feedback message, identifier information of the receiving end, information indicative of existence of another ARQ feedback message, constitution information of the ARQ feedback information, information indicative of whether bitmap information is a last bitmap, information indicative of a sequence number of the ARQ block contained in the first ARQ feedback information, and bitmap information indicative of error of the at least one ARQ block not represented using the first ARQ feedback information, using the first ARQ feedback information and the second ARQ feedback information.

19. The apparatus of claim 18, wherein the ARQ control message generator generates the ARQ feedback message to indicate the constitution information of the ARQ feedback information, information indicative of whether bitmap information is a last bitmap by equal field name.

20. The apparatus of claim 16, wherein the ARQ control message generator generates an ARQ feedback message comprising the third ARQ feedback information comprising information of a last ARQ block successfully received without error when detecting no erroneous ARQ block, and
further wherein the ARQ controller message generator generates an ARQ feedback message comprising the first ARQ feedback information comprising the first erroneous ARQ block information and the second ARQ feedback information when detecting the erroneous ARQ block.

21. The apparatus of claim 16, wherein the ARQ control message generator generates an ARQ feedback message for the ARQ sub-block comprising fourth ARQ feedback information comprising information of a first erroneous ARQ sub-block among at least two ARQ sub-blocks for which the ARQ feedback is not performed, and fifth ARQ feedback information indicative of error of at least one ARQ sub-block not represented in the fourth ARQ feedback information when the ARQ feedback is conducted on the ARQ sub-blocks retransmitted from the transmitting end by splitting the erroneous ARQ block into at least two ARQ sub-blocks, and
further wherein the ARQ control message generator adds the ARQ feedback message for the ARQ sub-block to the ARQ feedback message.

22. The apparatus of claim 21, wherein the ARQ control message generator generates the ARQ feedback message for the ARQ sub-block comprises at least one of type information of the ARQ feedback message, identifier information of the receiving end, information indicative of existence of another ARQ feedback message, information of a number of the ARQ blocks comprising the erroneous ARQ sub-block, identifier information of the ARQ block comprising the erroneous ARQ sub-block, constitution information of the ARQ feedback information, information indicative of whether bitmap information is a last bitmap, information indicative of a sequence number of the ARQ sub-block contained in the third ARQ feedback information, and bitmap information indicative of error of the at least one ARQ block not represented using the third ARQ feedback information, using the third ARQ feedback information and the fourth ARQ feedback information.

23. The apparatus of claim 22, wherein the ARQ control message generator generates the ARQ feedback message to indicate the constitution information of the ARQ feedback information, information indicative of whether bitmap information is a last bitmap by equal field name.

24. The apparatus of claim 16,
wherein the wireless communication system comprises an Advanced Air Interface (AAI) system,
wherein the information of the first erroneous ARQ block comprises a Sequence Number (SN) of an ARQ block,
wherein a most significant bit (MSB) of the second ARQ feedback information represents ACK or NACK information of an ARQ block identified by the SN,
wherein contiguous bits after the MSB of the second ARQ feedback information represent ACK or NACK information of contiguous ARQ blocks following the ARQ block identified by the SN, wherein the ARQ feedback message comprises a form of an Information Element (IE), and wherein the transmitting comprises use of Media Access Control (MAC) layer acknowledgment.

25. An apparatus for generating an Automatic Repeat reQuest (ARQ) feedback message at a receiving end in a wireless communication system, the apparatus comprising:
  a receiver for receiving ARQ blocks and ARQ sub-blocks;
  an ARQ controller for checking for error in the ARQ blocks and the ARQ sub-blocks received from a transmitting end through the receiver, and for controlling to perform ARQ feedback to the transmitting end by taking into account an ARQ feedback execution time;
  an ARQ control message generator for, when the feedback for the ARQ sub-blocks is performed, generating an ARQ feedback message comprising first ARQ feedback information comprising information of a first erroneous ARQ sub-block of one or more ARQ sub-blocks, and second ARQ feedback information indicative of error of at least one ARQ sub-block not represented in the first ARQ feedback information; and
  a transmitter for transmitting the ARQ feedback message to the transmitting end.

26. The apparatus of claim 25, wherein the ARQ control message generator generates the second ARQ feedback information as a bitmap indicative of error of the at least one ARQ sub-block not represented in the first ARQ feedback information and error of the first erroneous ARQ sub-block.

27. The apparatus of claim 25, wherein the ARQ control message generator generates the ARQ feedback message comprising at least one of type information of the ARQ feedback message, identifier information of the receiving end, information indicative of existence of another ARQ feedback message, information of a number of the ARQ blocks comprising the erroneous ARQ sub-block, identifier information of the ARQ block comprising the erroneous ARQ sub-block, constitution information of the ARQ feedback information, information indicative of whether bitmap information is a last bitmap, information indicative of a sequence number of the ARQ sub-block contained in the third ARQ feedback information, and bitmap information indicative of error of the at least one ARQ block not represented using the third ARQ feedback information, using the first ARQ feedback information and the second ARQ feedback information.

28. The apparatus of claim 27, wherein the ARQ control message generator generates the ARQ feedback message to indicate the constitution information of the ARQ feedback information, information indicative of whether bitmap information is a last bitmap by equal field name.

29. The apparatus of claim 25, wherein the ARQ control message generator generates an ARQ feedback message comprising the third ARQ feedback information comprising information of a last ARQ sub-block successfully received without error when the ARQ sub-blocks for the ARQ feedback comprise no erroneous ARQ sub-blocks, and
  further wherein the ARQ control message generator generates an ARQ feedback message comprising the first ARQ feedback information comprising the first erroneous ARQ sub-block information and the second ARQ feedback information when detecting the erroneous ARQ sub-block among the ARQ sub-blocks of the ARQ feedback.

30. The apparatus of claim 25,
  wherein the wireless communication system comprises an Advanced Air Interface (AAI) system,
  wherein the information of the first erroneous ARQ block comprises a Sequence Number (SN) of an ARQ block,
  wherein a most significant bit (MSB) of the second ARQ feedback information represents ACK or NACK information of an ARQ block identified by the SN,
  wherein contiguous bits after the MSB of the second ARQ feedback information represent ACK or NACK information of contiguous ARQ blocks following the ARQ block identified by the SN,
  wherein the ARQ feedback message comprises a form of an Information Element (IE), and wherein the transmitting comprises use of Media Access Control (MAC) layer acknowledgment.

* * * * *